United States Patent
Detlefsen

(10) Patent No.: US 6,699,958 B1
(45) Date of Patent: Mar. 2, 2004

(54) COLORLESS PHENOL-FORMALDEHYDE RESINS THAT CURE COLORLESS

(75) Inventor: William D. Detlefsen, Springfield, OR (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 10/365,873

(22) Filed: Feb. 13, 2003

(51) Int. Cl.$^7$ ............................. C08G 14/08; C08J 3/07
(52) U.S. Cl. ................... 528/129; 528/137; 528/142; 528/162; 528/164; 528/176; 528/486; 528/489; 528/491; 528/503; 524/594; 524/597; 524/599
(58) Field of Search ..................... 528/129, 137, 528/142, 162, 164, 176, 486, 489, 491, 503; 524/594, 597, 599

(56) References Cited

U.S. PATENT DOCUMENTS

| | | |
|---|---|---|
| 3,296,181 A | 1/1967 | Wurmli et al. |
| 3,624,038 A | 11/1971 | Weldner |
| 3,905,935 A | 9/1975 | Irwin et al. |
| 4,173,684 A | 11/1979 | Stolfo |
| 4,200,706 A | 4/1980 | Starks |
| 4,226,962 A | 10/1980 | Stolfo |
| 4,245,083 A | 1/1981 | Reitz |
| 4,264,671 A * | 4/1981 | Gillern et al. ............. 428/302 |
| 4,281,098 A | 7/1981 | McCormick |
| 4,297,473 A | 10/1981 | Koshibe et al. |
| 4,453,002 A | 6/1984 | Maurer et al. |
| 4,612,254 A | 9/1986 | Ginter et al. |
| 4,870,154 A | 9/1989 | Saeki et al. |
| 5,096,983 A | 3/1992 | Gerber |
| 5,145,913 A | 9/1992 | Gerber |
| 5,208,274 A | 5/1993 | Gerber |
| 5,214,111 A | 5/1993 | Gerber |
| 5,262,495 A | 11/1993 | Gerber |
| 5,310,855 A | 5/1994 | Walz et al. |
| 5,345,001 A | 9/1994 | Schroter et al. |
| 5,446,089 A | 8/1995 | Shiau et al. |
| 5,902,442 A | 5/1999 | Phillips et al. |
| 6,113,729 A | 9/2000 | Chiu |
| 6,214,964 B1 | 4/2001 | Ryan |

* cited by examiner

Primary Examiner—Duc Truong
(74) Attorney, Agent, or Firm—Gardner Carton & Douglas LLP

(57) ABSTRACT

The present invention is directed to compositions and a process leading to colorless or light colored aqueous phicinol-formaldehyde resoles. Unlike previous technologies, these compositions lead to clear storage stable fast curing, high molecular weight resins. These materials are also capable of producing composite wood panels with superior water absorption and thickness swell test results when soaked in water. The invention essentially consists of an aqueous copolymer of phenol, formaldehyde, and a phenolic carboxylate (e.g. salicylic acid). Methylol phenols are formed under alkaline conditions in the presence of metal chelating agents. These are then condensed into a polymer under alkaline, neutral or acidic conditions. The finished aqueous polymer solution is then acidified to the desired pH using a benzoic acid or a phelnol-carboxylic acid.

60 Claims, 5 Drawing Sheets

COLORLESS PHENOL-FORMALDEHYDE RESINS THAT CURE COLORLESS

FIELD OF THE INVENTION

The present invention relates to compositions and a process leading to colorless or light colored aqueous phenol-formaldehyde resoles.

BACKGROUND OF THE INVENTION

Lignocellulosic composites primarily find use in construction or fabrication. These composites may be used in building construction or any fabrication where wood is a traditional material used. Absorption of water by the composites encourages growth of wood-rotting fungi and other microorganisms that detract from the appearance and functionality of the composites. Additional problems associated with water absorption are raised joints, buckling of panels, and unevenness. Furthermore, the poor dimensional stability of state-of-the-art lignocellulosic composites affects their mechanical properties and reduces their load carrying ability. Another result of poor dimensional stability is unevenness of roof and floor underlayments, and of building siding.

Lignocellulosic composite panels are conventionally manufactured by hot pressing lignocellulosic materials with wax and thermosetting resin. This is referred to as a conventional bonding process. The wax is a sizing agent to improve the water resistance of the once-formed composite. The resin is a binding agent that holds the materials comprising the composite together, thus forming them into a unitary shape. In the production of such panels, a phenolic binder, e.g. phenol-formaldehyde resin, is applied to cellulose components such as chips or veneers to form a mat or to otherwise consolidate the components. The consolidated components, also referred to as a mat herein, are then placed between two heated platens and pressed into the composite panels.

Conventional phenol-formaldehyde resoles that have low free phenol content and are clear or lightly colored typically have a low molecular weight. They are low in molecular weight because they are low in alkali content. Raising the alkali content results in a more highly colored resin. These low molecular weight resoles require more press time during the formation of the composite panels than would a high molecular weight resole. A high molecular weight resole would lessen the press time which would increase the efficiency of the production process of the panels.

The prior art phenol-formaldehyde resin used in the manufacture of lignocellulosic composites may be in the form of a solid or a liquid. Powdered phenolic resins, such as novolac, resole, or combinations thereof, may generally be used. U.S. Pat. No. 4,098,770 to Berchem, et al., discloses a typical spray-dried phenol-formaldehyde resin, modified with added non-phenolic polyhydroxy compounds, used in the manufacture of waferboard. Liquid phenol-formaldehyde resins, such as resole or resole and novolac combinations, may also be generally used in the manufacture of lignocellulosic composites. Parameters for the manufacture of either liquid or solid phenol-formaldehyde resins are disclosed in Phenolic Resins, Chemistry, Applications and Performance, (A. Knop and L. A. Pilato, Springer-Verlag (1985)) and Advance Wood Adhesives Technology, (A Pizzi, Marcel Dekker (1994)).

Resoles are the result of the condensation of phenolic compounds with aldehydes (typically formaldehyde) in a strongly alkaline medium. After completion of the condensation reaction, the reaction mixture is neutralized with an acid, such as dilute HCl. Water mid excess phenol are then largely distilled off. In order to obtain a low phenol containing resole, a very strong alkaline solution is needed. Neutralization with a strong acid results in precipitation of salts.

U.S. Pat. No. 5,345,001 issued to Schroter et al. teaches a low free phenol, phenol-formaldehyde resole wherein the condensate is neutralized with an aromatic hydroxy carboxylic acid. Schroter et al. do not teach adding a metal chelating agent to the condensation mixture. Furthermore, the pH of the resins produced by Schroter et al are basic, and Schroter et al. do not teach acidifying the resins.

In the production of lignocellulosic composite panels, there is a need for a phenol-formaldehyde resole that has low amounts of free phenol, is clear or light colored, is water soluble, has a high molecular weight, stable in solution during storage, soluble at an acidic pH, and has low viscosity. Also the resole should produce a fast cure, and result in low water absorption and thickness swell of the panels.

SUMMARY OF THE INVENTION

Unlike previous technologies, embodiments of the present invention lead to clear, storage stable, fast curing, high molecular weight resins. These compositions are also capable of producing composite wood panels with superior water absorption and thickness swell test results when soaked in water.

The present invention is directed to an aqueous, high molecular weight, resole produced by a condensation of a phenolic compound with an aldehyde in the presence of a metal chelating agent, a strong base and a phenolic carboxylate, followed by acidification of the solution to a desired pH with an acid.

The present invention is also directed to a process for the preparation of an aqueous, high molecular weight, resole solution which includes: (a) heating a phenolic compound, an aldehyde, a strong base, a phenolic carboxylate, and a metal chelating agent at a temperature ranging from about 60° to about 75° C., forming a methylol solution, (b) condensing the methylol solution of step (a) at a pH ranging from about 8 to about 10, forming a polymer solution, and (c) acidifying the polymer solution of step (b) with an acid.

The present invention is further directed to a process for the preparation of an aqueous, high molecular weight resole solution which includes: a) heating a phenolic compound, a strong base, a phenolic carboxylate, and a metal chelating agent at a temperature ranging from about 60° to about 75° C., forming a solution; b) adding an excess of aldehyde to the solution of step (a) to form a mixture and condensing the mixture at about 90° C. under a vacuum of about 11.8 inches of Mercury to a Gardner-Holdt viscosity of U to Z; c) cooling the mixture of step (b) to a temperature of about 70° C., adding additional phenol to a desired molar ratio, and adjusting the mixture to a pH of about 9 with an alkali metal hydroxide while holding the mixture at about 70° C. until the free formaldehyde falls to a desired level; and d) acidifying the solution of step(c) with an acid.

Another embodiment of the present invention is directed to a bonding resin that cures clear when employed in the production of composite wood panels containing the aqueous, high molecular weight resole solution of the invention.

The invention is further directed to an aqueous, high molecular weight, resole solution containing an acid and a condensate of a phenolic compound and an aldehyde, the condensate formed in the presence of a metal chelating agent, a strong base and a phenolic carboxylate.

A further embodiment of the invention is directed to a clear, cured resin comprising the aqueous, high molecular weight, resole solution of the present invention.

DETAILED DESCRIPTION OF THE DRAWINGS

Figure 3:
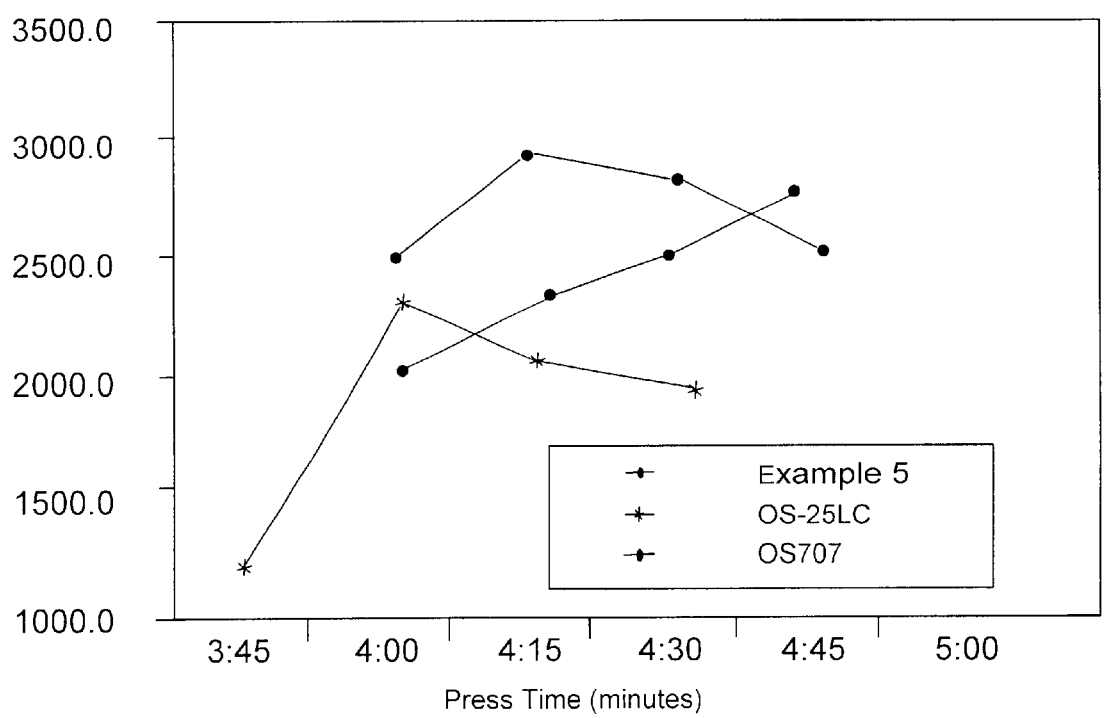
FIG. 3 is a comparison of the resin of the present invention to commercial controls in bending after boiling for 2 hours.
Figure 4:
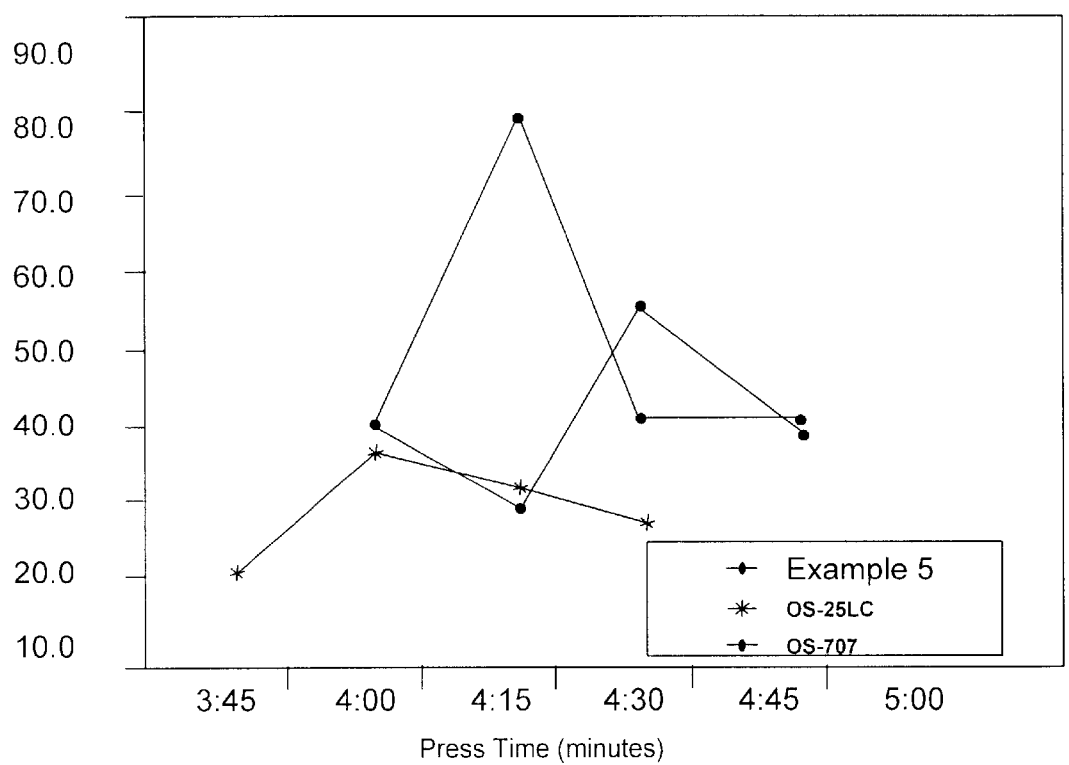

FIG. 4 expresses the same data as FIG. 3 as a percent retention of the original bending (MOR) value.

Figure 5:
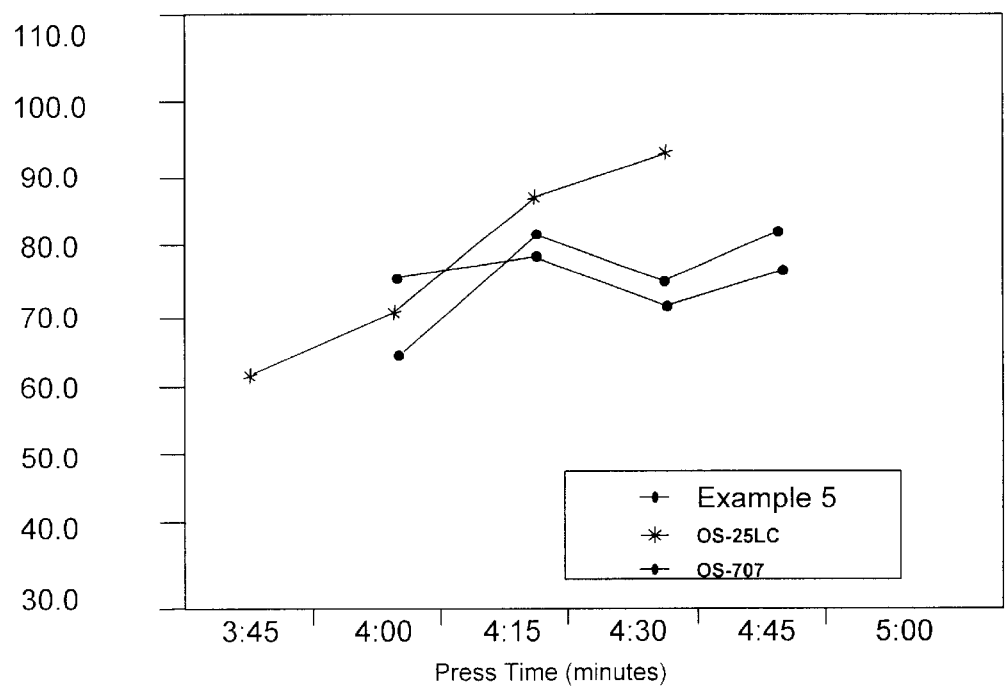

FIG. 5 is a comparison of the internal bonding of the resin of the present invention to commercial controls.

DETAILED DESCRIPTION OF THE INVENTION

The resole solutions of the present invention are soluble in neutral or acidic aqueous solutions, as well as alkaline solutions. This permits attainment of the heretofore-unavailable combination of high molecular weight and acid solubility in aqueous solution at solids levels that permit low viscosity for easy handling and spraying onto lignocellulosic materials. The resole solutions of the instant invention are either clear or light-colored solutions, and they remain colorless or light in color when cured as resins. The water absorption and thickness swell of lignocellulosic panels containing the resoles of the present invention is low due to the low pH of the resole.

The alkali that is found in phenolic resoles is the primary cause of much of the water absorption observed in wood-based composites. Previous resoles made at lower pH had to be low molecular weight or they would precipitate from solution. Such two-phase systems could be emulsified, but the emulsifiers also tend to exacerbate water absorption. Low molecular weight resoles lead to slow cure. Slow cure nullifies the effects of low pH to a large extent because a high level of cure is a prerequisite for low water absorption and reduced thickness swell of the wood-based composites. Thus, to obtain the benefits of low pH on previous systems, long pressing times were required. The resole solution of the present invention permits fast cure and is, thus, an improvement over conventional resoles in the wood products industry.

The cure of the resoles of the instant invention are autocatalytic under curing conditions due to the release of carbon dioxide, but the catalytic effects require heat for activation. When materials such as salicylates (carboxyl phenols), are incorporated into a phenol-formaldehyde resole, they have a natural tendency to reduce the reactivity of the resole under storage conditions (and resin manufacturing conditions) due to the electron-withdrawing nature of the carboxyl group. This provides for improved stability. Under alkaline resin manufacturing conditions, this functional group is converted to a carboxylate, which is less deactivating, allowing resin formation. Since the carboxylate remains in the salt form (unprotonated) to a larger extent than a simple phenol at relatively low pH, solubility is maintained. When salicylic acid (or other carboxylic phenol capable of thermal decomposition) is heated to high temperatures, as provided for the cure of composite wood panels, decarboxylation occurs leading to production of phenol and carbon dioxide. Low pH improves the efficiency of this process. The carbon dioxide evolved then accelerates the cure of the phenolic resole. The accelerating effect of carbon dioxide is magnified as the system pH is reduced. Other known phenolic accelerators, e.g. esters, will not function under these conditions, unless they too produce carbon dioxide. The conversion of the phenolic carboxylate to phenol also activates the aromatic ring involved and opens the way to further cross-linking. The loss of solubility that simultaneously occurs is also valuable toward production of a water-repellent resite.

Low pH curing permits use of low-cost and convenient sources of carbon dioxide (e.g. urea) for catalysis if the latent catalysis needs enhancement. By judicious choice of system pH, some latency may also be attained with these materials.

The materials utilized in embodiments of the present invention are less harmful to the environment than previous technologies relying on organic phosphites to attain colorless products. Such materials were also not compatible with the relatively high water contents required to attain the low viscosities desired for spraying or applying resins in the manufacture of wood composites. The materials utilized herein are also much more economical than accelerators based on esters or polyhydoxylic phenols such as resorcinol. Furthermore, the materials of this invention do not leave plasticizing residues that might weaken the cured resite or promote water absorption and thickness swell. This is a problem with esters, carbazoles, and organic carbonates such as propylene carbonate. Volatile organic emissions are minimized compared to systems relying on organic solvents or organic-water co-solvents.

The condensation reaction is carried out in a manner known per se by heating a condensate mixture containing phenolic compound, an aldehyde, a strong base, a phenolic carboxylate, and a metal chelating agent at a temperature from about 70° to about 100° C. for about 1 to about 8 hours in an aqueous solution.

A preferred condensation method, includes heating a mixture of a phenolic compound, a strong base, a phenolic carboxylate, and a metal chelating agent to a temperature of about 60° to about 75° C., adding an excess of aldehyde to the mixture, heating the mixture to a temperature of about 90° C. under a vacuum of about 11.8 inches of mercury to a Gardner-Holdt viscosity of U to $Z_1$, cooling the mixture to a temperature of about 70° C., adding additional phenol to a desired molar ratio (from about 1.8 to about 3.0, preferably from about 2.0 to about 2.5), and adjusting the mixture to a pH of about 9 with an alkali metal hydroxide while holding the mixture at about 70° C. until the free formaldehyde falls to a desired level, and acidifying the mixture with an acid. The amount of free formaldehyde present is less than 2%, preferably less than 1.5%. The resulting resin contains polymers having a broad range of molecular weights. The broad distribution of molecular weights coupled with the low pH of the resin imparts exceptional water absorption and thickness swell properties to lingocellulosic composites made with the resin.

All phenolic compounds and aldehydes known in the production of phenol resins can be used in the present invention. A preferred phenolic compound is phenol but also aliphatic or aromatic substituted phenols as well as multivalent phenols can be used. Examples include but are not limited to, cresols, xylenols, tertiary octylphenol, naphthols, p-phenylplhenol, bisphenols or resorcinol, as well as natural substances such as for example cardenol or cardol. The phenolic compounds can be used as single compounds or in any desired mixture.

Aldehydes having the general formula R-CHO may be used in the resins of the present invention. Examples include, but are not limited to, formaldehyde, acetaldehyde, propyladehyde, n-butylaldehyde or isobutyladehyde, glyoxal or furfural. The preferred aldehyde is formaldehyde such as paraformaldehyde or trioxane. The form in which formaldehyde is preferably added is an aqueous solution with a formaldehyde content of more than 30% (formalin), preferably about 50%.

The molar ratio of the phenolic compound to aldehyde useful in making the resins of the present invention ranges from about 1:1.8 to about 1:3.0, preferably from about 1:2.0 to about 1:2.5.

The phenolic carboxylate includes, but is not limited to, salicyclic acid. The amount of phenolic carboxylate ranges from about 1 to about 10 weight percent, preferably from about 1 to about 3 weight percent, based on the total weight of the resin.

The alkalinity of the condensate mixture is achieved through the addition of a strong base, preferably sodium hydroxide or another alkali metal hydroxide, in a sufficient amount to achieve a pH ranging from about 8.0 to about 10.0, preferably about 9.0. The amount of alkali metal ranges between about 1 to about 6 percent by weight, based on the total weight of the condensation mixture.

The metal chelating agent may be any agent that will chelate iron. Examples include, but are not limited to, citric acid, disodium ethylenediaminetetraacetic acid (EDTA), nitrilotriacetic acid, urea, hydroxycarboxylic acids, gluconic acid, tartaric acid, metaphosplhates, soluble proteins, and amino acids, and combinations thereof. The chelating agent is present in an amount ranging from about 0.02 to about 2 weight percent, preferably from about 0.05 to about 0.25 weight percent, based on the total weight of the condensate mixture.

Urea may be added to the condensate mixture in an amount ranging from about 0.5 to about 20 weight percent, based on the total weight of the condensate mixture. The amount of urea depends on whether the urea is added at the beginning or at the end of the process.

Following condensation of the condensate mixture, the mixture is acidified with an acid. Suitable acids include, but are not limited to benzoic acid, ascorbic acid, salicylic acid, phltlalic acid, para-toluene sulfonic acid, phenolsulfonic, and combinations thereof. The amount of acid added to the mixture is an amount sufficient to result in a pH of the mixture ranging from about 5 to about 8, preferably from about 6.0 to about 7.0. The amount of the acid ranges from about 1 to about 5 weight percent (as benzoic equivalents), based on the total amount of the final composition. The amount of the acid depends on the acid employed.

The resoles of the present invention may be used in a bonding resin for lignocellulosic materials employed in the production of composite wood panels. The lignocellulosic materials include, but are not limited to, wood fiber, wood flake, wood strands, wood chips and wood particles, and mixtures thereof. The lignocellulosic materials listed here are referred to in the art as wood furnish. However, it is well known that other furnish, such as straw, bagasse, wood bark, recycled wood fiber, recycled paper fiber, and mixtures thereof, may also be used. The composite panels thus produced are known as fiberboard, waferboard, strandboard, oriented strandboard, flakeboard, particleboard and the like.

In the conventional hot press method of manufacture of lignocellulosic composites, a lignocellulosic material is combined with a phenolic resin containing an aqueous, high molecular weight resole solution of the present invention and other components in a blender or mixer. The blend or mixture that results is pressed, typically under pressures above atmospheric and temperatures greater than room temperature, to produce the composite. The wood furnished, once blended or mixed with the phenolic resin, is then formed onto a support material to make a pre-form in the approximate shape of the finished good. The pre-form is then placed on a caul plate in a hot press where the finished good is produced by applying pressures above atmospheric and temperatures greater than room temperature. The elevated temperatures and pressures cause the phenolic resin to polymerize, thus binding the pre-form into a unitary finished good. The hot press method is further described in U.S. Pat. No. 4,433,120 to Shui-Tunig Chiu.

Wax sizing may also be added to the mixture of wood furnish and resin before pressing the composite. Examples include, but are not limited to molten slack wax, vegetable wax, paraffin wax, and the like, including aqueous emulsion versions.

The lignocellulosic composites can be cured more rapidly by injecting steam into the lignocellulosic mat to heat the resin. This heats the lignocellulosic composite by injecting steam directly into the composite through openings in the press platens. Steam injection press cycle times are generally much shorter than with conventional pressing times since the heat transfer into the board is almost instantaneous.

Board density is determined by trimming the board to 350 mm×350 mm, measuring the thickness to the nearest 0.001 inches (0.025 mm), weighing the sample to the nearest 0.1 g and calculating the weight per unit volume.

The cold water thickness swell test and water absorption test includes placing a specimen in a water bath maintained at 21±1° C. for 24 hours. The specimen is held at 25 mm below the water surface for the 24 hour immersion period. Thickness swell is determined by measuring the thickness of the specimen at its center point before and after soaking in cold water for 24 hours. It is expressed as a percentage of initial thickness: final thickness minus initial thickness divided by initial thickness times 100. Water absorption is the weight after soaking minus the weight before soaking divided by the weight before soaking multiplied by 100. It is expressed as a percent of the initial weight.

The internal bond (IB), MOR and 2 hour boiled MOR tests are conducted according to the CSA standard CAN3-0437.

The following examples describe several preferred embodiments to illustrate the invention. However, it is to be understood that the invention is not intended to be limited to the specific embodiments.

EXAMPLE 1

29.39% phenol, 0.201% citric acid, 0.072% Hampene-2Na, 2.189% salicylic acid, 3.637of 51.5% formaldehyde, and 3.425% of 50% NaOH, were charged at room temperature to a 5 liter round-bottom flask. The reaction mixture was heated to 65° C.

The reaction mixture was charged with 32.784% 51.5% formaldehyde over 30–45 minutes at 65° to 70° C. The reaction mixture was held at 70° C. until the free HCHO was less than 0.5%.

The reaction mixture was then charged with 6.850% water and held to a Gardner-Holdt viscosity "N" at 70° to 74° C.

The reaction mixture was then charged with 8.979% urea, 7.462% water, and 5.011% ascorbic acid.

EXAMPLE 2

27.827% phenol, 0.191 % citric acid, 0.067% Hampene-2Na, 2.071% salicylic acid, 4.3280% water and 3.243% of 50% NaOH, were charged in at room temperature to a 5 liter round-bottom flask. The reaction mixture was heated to 65° C.

The reaction mixture was charged with 39.636% of 51.5% formaldehyde over 30–45 minutes at 65° to 70° C. The reaction mixture was held at 70° C. until the free HCHO was less than 1.0%.

The reaction mixture was then charged with 5.561% water and held to a Gardner-Holdt viscosity "H" at 70° to 74° C. The reaction mixture was cooled to 40° C. The reaction mixture was then charged with 9.255% urea, 5.213% water, and 2.607 benzoic acid.

EXAMPLE 3

36.148% phenol (85% phenol solution), 0.248% citric acid, 0.088% Hampene-2Na. 2.692% salicylic acid. 4.473% water, and 4.213% of 50% NaOH, were charged in at room temperature to a 5 liter round-bottom flask. The reaction mixture was heated to 65° C.

The reaction mixture was charged with 40.327% of 51.5% formaldehyde over 30–45 minutes at 65° to 70° C. The reaction mixture was held at 70° C. until the free HCHO was less than 0.5%.

The reaction mixture was then charged with 8.426% water and held to a Gardner-Holdt viscosity "H" at 70° to 74° C. The reaction mixture was cooled to 40° C. The reaction mixture was then charged with 1.693% ascorbic acid and 1.693 benzoic acid.

EXAMPLE 4

30.386% phenol, 0.177% citric acid, 0.063% Hampene-2Na, 6.606% salicylic acid, and 5.814% of 50% NaOH, were charged in at room temperature to a 5 liter round-bottom flask. The reaction mixture was heated to 65° C.

The reaction mixture was charged with 45.091% of 51.5% formaldehyde over 30–45 minutes at 65° to 70° C. The reaction mixture was held at 70° C. until the free HCHO was less than 1.0%.

The reaction mixture was then charged with 4.623% water and held to a Gardner-Holdt viscosity "H" at 70° to 74° C. The reaction mixture was cooled to 40° C. The reaction mixture was then charged with 4.836% water. 2.308 benzoic acid, 0.057% ascorbic acid and 1.693 benzoic acid.

EXAMPLE 5

11.815% phenol, 0.205 % citric acid, 0.073% Hampene-2Na. 2.242% salicylic acid, and 3.514% of 50% NaOH, were charged in at room temperature to a 5 liter round-bottom flask. The reaction mixture was heated to 62° C.

The reaction mixture was charged with an excess (about 42.902%) of 51.5% formaldehyde over 30–45 minutes at 65° to 70° C. The reaction mixture was heated to 90° C. under a vacuum of 11.8 inches of Mercury to a Gardner-Holdt viscosity "U to V".

The reaction mixture was cooled to 70° C., then charged with 5.511% water and 23.622% phenol and held to a Gardner-Holdt "H" at 70° C. The pH of the mixture was adjusted to 9 with the slow addition of 1.647% of 50% NaOH while holding the temperature of the mixture at 70° C. The temperature was held to 70° C. until the free formaldehyde was less than 2%. The reaction mixture was then charged with 5.644% water and 2.825% benzoic acid and cooled, forming a resin. After cooling, 10 parts urea were added to 100 parts of resin.

The pH and the color of Examples 1–5 are shown in Table 1. As illustrated in Table 1, the resins of the present invention are clear and colorless or light colored with a pH of 8 or less.

TABLE 1

Resin Data Table

| Example | PH | Color |
|---------|------|-------------------------|
| 1 | 5.77 | clear very pale yellow |
| 2 | 6.23 | clear colorless |
| 3 | 6.93 | clear colorless |
| 4 | 6.87 | clear gray-white |
| 5 | 7.18 | clear light brown-orange |

The resins of Examples 1–5 were stored at room temperature for 20 days. The viscosity of the resins were measured at 0 day, 5 days, 10 days, 15 days, and 20 days. The results are shown in Table 2. The viscosity of Example 5 was further measured at days 25, 30, 35, 40, 45, and 50. The measured viscosity was 141, 194, 266, 365, 500, and 687 centipoise (cp), respectively.

TABLE 2

Viscosity (cp) of Resins at 25° C.

| | Example | | | | |
|------|-----|-----|-----|-----|-----|
| Days | 1 | 2 | 3 | 4 | 5 |
| 0 | 131 | 105 | 254 | 184 | 37 |
| 5 | 180 | 166 | 311 | 234 | 40 |
| 10 | 247 | 262 | 379 | 297 | 55 |
| 15 | 340 | 413 | 463 | 377 | 75 |
| 20 | 467 | 651 | 566 | 479 | 103 |

EXAMPLE 6

Strandboards were made employing the resole described as Example 2. Laboratory-sized three-layer strandboards measuring 400 mm×400 mm×11 mm were made. This was accomplished by first spraying aspen furnish, previously dried to about 2% moisture content, with the resin and wax emulsion then felting the treated furnish onto a carbon steel caul plate to form a mat.

The mat moisture content was measured for each specimen prepared. Mat moisture was determined after blending the wood finish with wax and resin. This was accomplished using the "moisture teller" method (Dietert brand moisture teller). This method consists of weighing 19–21 grams of wet wood furnish and drying with 133° C. hot air for 15 minutes. After cooling in a desicator, re-weigh the dried furnish weight. The mat moisture content was then calculated from the ratio of the weight difference of the wet and dried furnish to the weight of the dried furnish.

The strandboard contained three layers, two surface layers and a core layer. The core layer consisted of 1640 grams of wood furnish, 33 grams resin, and 25 grams wax, oven dried basis. The surface layers consisted of 2004 grams wood furnish, 70 grams resin, and 30 grams wax oven dried basis. The surface layers were sprayed together and the core layer was sprayed separately. The surface layers were bonded with the resole described as Example 2 and the core layer was bonded with Rubiinate 1840 (available from Huntsman Polyurethianies. Inc. Geismar. La.). Sufficient wood was sprayed to make four boards in each blender load. The felting proceeded by laying the bottom surface layer directly on the caul plate, laying the core layer on the bottom surface layer, then felting the top surface on the core layer to finish the mat. The weight ratio of surface to core was 55:45 overall, each face comprising half of the total. A second caul plate was laid on top and the mat was pressed under pressure and an elevated temperature as described below.

Strandboards were made by hot pressing mats at 215° C. and press time of 2 to 2.75 minutes. The maximum pressure applied to any one mat was 3.5 MPa. The board thickness was controlled by metal stops. The press times included 25 seconds degassing time. Boards were placed in an insulated hot box immediately after pressing and allowed to remain there overnight. After removal from the hot box, panels were allowed to equilibrate to room conditions before cutting and testing.

The boards were then cut into specimens and tested for board density, IB, MOR, 2 hour boiled MOR, water absorption, and thickness swell according to the methods described above. The results are shown in Table 3.

EXAMPLE 7

Strandboards were made employing the resole of Example 3 according to the same procedure described in Example 6.

The boards were cut into specimens and tested for board density, [B, MOR, 2 hour boiled MOR, water absorption, and thickness swell according to the methods described above. The results are shown in Table 3.

TABLE 3

| Example | Board Density (Kg/m³) | IB (MPa) | MOR (MPa) | 2 Hour Boiled MOR (MPa) | WA (%) | Thickness Swell (%) |
| --- | --- | --- | --- | --- | --- | --- |
| 6 | 37.70 | 50 | 5739 | 1825 | 30.5 | 9.9 |
| 7 | 38.53 | 46 | 5025 | 2014 | 33.9 | 11.7 |

EXAMPLE 8

Standboards were made with the resole of Example 5 according to the following procedure.

Laboratory-sized three-layer strandboards measuring 400 mm×400 mm×18 mm were made by first spraying aspen furnish, previously dried to about 2% moisture content, with the appropriate resin and wax emulsion then felting the treated furnish onto a carbon steel caul plate to form a mat.

The mat moisture content was measured for each specimen prepared. Mat moisture was determined after blending the wood finish with wax and resin. This was accomplished using the "moisture teller" method (Dietert brand moisture teller). This method consists of weighing 19–21 grams of wet wood furnish and drying with 133° C. hot air for 15 minutes. After cooling in a desicator, re-weigh the dried furnish weight. The mat moisture content was then calculated from the ratio of the weight difference of the wet and dried furnish to the weight of the dried furnish.

The strandboard contained three layers, two surface layers and a core layer. The core layer consisted of 2665 grams of wood furnish, 159 grams resin, and 53 grams wax, oven dried basis. The surface layers consisted of 3245 grams wood furnish, 211 grams resin, and 65 grams wax, oven dried basis. The surface layers were sprayed together and the core layer was sprayed separately. Sufficient wood was sprayed to make four boards in each blender load. The surface layers were bonded with the resole of Example 5 and the core binder was Rubinate 1840. The felting proceeded by laying the bottom surface layer directly on the caul plate, laying the core layer on the bottom surface layer, then felting the top surface on the core layer to finish the mat. The weight ratio of surface to core was 55:45 overall, each face comprising half of the total. A second caul plate was laid on top and the mat was pressed under pressure and an elevated temperature as described below.

Strandboards were made by hot pressing mats at 215° C. and press time of 3.75 to 5.00 minutes The maximum pressure applied to any one mat was 3.5 MPa. The board thickness was controlled by metal stops. The press times include 25 seconds degassing time. Boards were placed in an insulated hot box immediately after pressing and allowed to remain there overnight. After removal from the hot box, panels were allowed to equilibrate to room conditions before cutting and testing.

The boards made as described above were then cut into specimens and tested for internal bond (IB), modulus of rupture (MOR), 2 hour boiled MOR, and thickness swell after being soaked in cold (23° C.) water for 24 hours. For each panel, three 51 mm×51 mm pieces were cut for IB determinations. Two 125 mm×125 mm pieces were used for the 24 hour cold water soak thickness swell and 2 hour boiled MOR tests.

For comparison purposes, strandboards were made with commercial resoles in place of the resin of Example 6. The commercial resoles were Cascophen® OS-707, available from Borden Chemical. Inc. of Sheboygan, Wis. and Cascophen® OS-25LC, available from Borden Chemical, Inc of Diboll. Tex. or Borden UK. FIGS. 1–5 show a comparison of the commercial resoles over the resin of the present invention.

Figure 1:
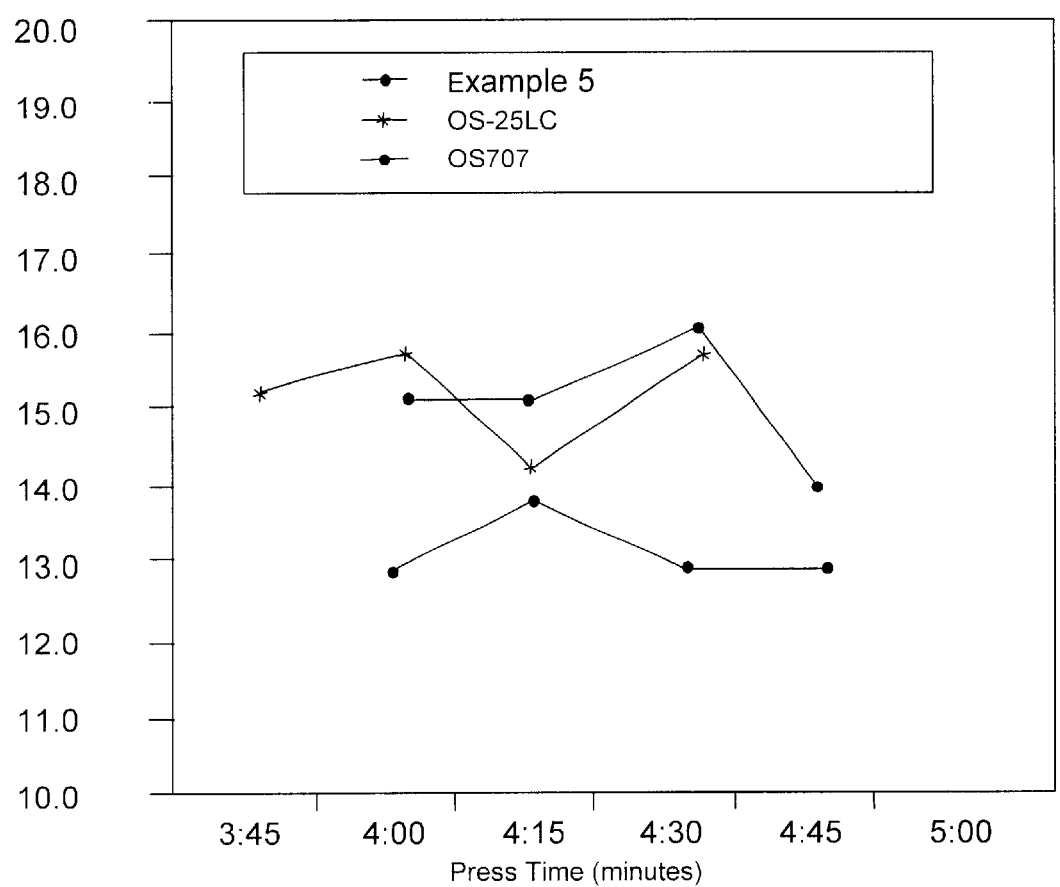
FIG. 1 is a water absorption comparison of a resin of the present invention to two commercial resins.

FIG. 1 illustrates the water absorption comparison of a strandboards made with the resin of the present invention with strandboards made with the commercial resoles. As shown in h FIG. 1, the water absorption of the strandboards made with the resin of the present invention was substantially lower than the water absorption of the strandboards made with the commercial resoles.

Figure 2:
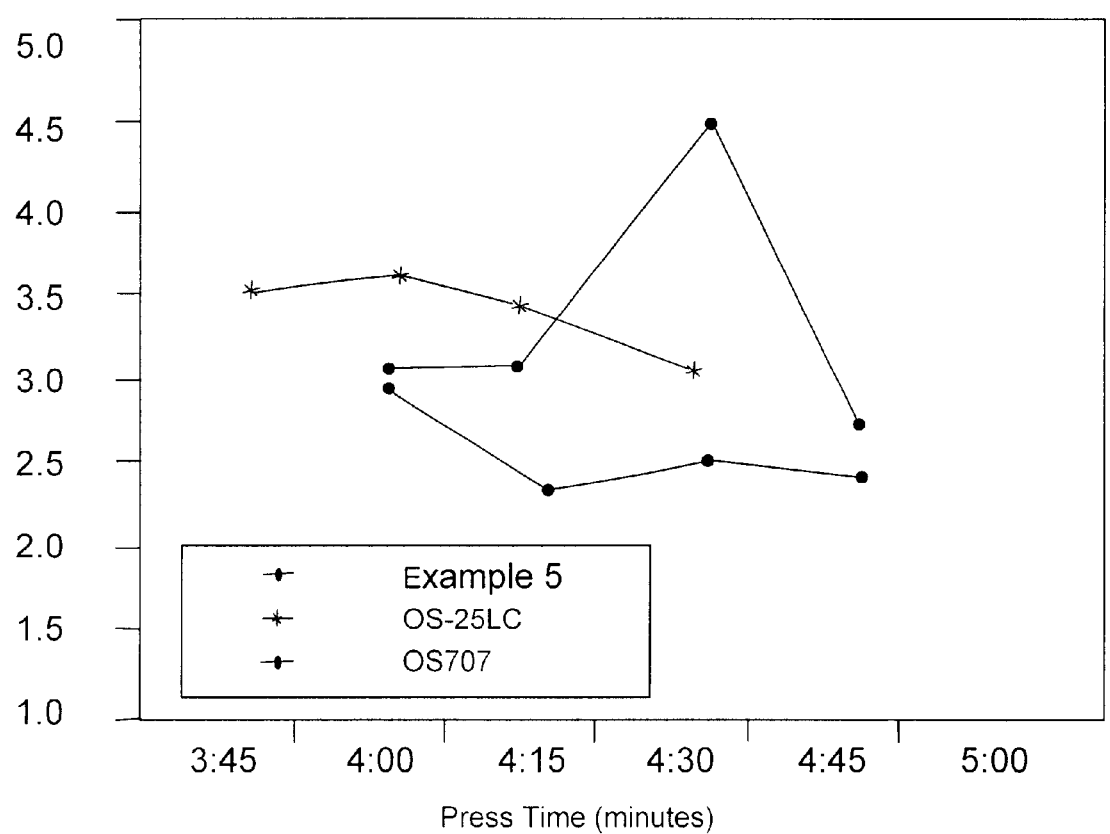
FIG. 2 is a thickness swell comparison of a resin of the present invention to two commercial resins.

FIG. 2 illustrates the thickness swell comparison of a strandboards made with the resin of the present invention with strandboards made with the commercial resoles. As shown in FIG. 2, the thickness swell of the strandboards made with the resin of the present invention was substantially lower than the water thickness swell of the strandboards made with the commercial resoles.

FIG. 3 illustrates the bending strength (after boiling for two hours) comparison of a strandboards made with the resin of the present invention with strandboards made with the commercial resoles. As shown in FIG. 3, bending strength (after boiling for two hours) of the strandboards made with the resin of the present invention was comparable to the bending strength (after boiling for two hours) of the strandboards made with the commercial resoles. Bending strengths are expressed in psi.

FIG. 4 illustrates the data of FIG. 3 as a percentage of the original bending values for the tested resins. The values for the resin of the present invention are comparable to the values of the commercial resoles.

FIG. 5 shows a comparison of the internal bonding ability of the resin of the present invention compared with conventional resoles. As shown in FIG. 5, the resin of the present invention shows adequate bonding and cure speed and is in the same range as commercial standards.

All references, including publications, patent applications, and patents, cited herein are hereby incorporated by reference to the same extent as if each reference were individually and specifically indicated to be incorporated by reference and were set forth in its entirety herein.

While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. An aqueous, high molecular weight resole solution produced by a condensation of a phenolic compound with an aldehyde in the presence of a metal chelating agent, a strong base and a phenolic carboxylate, followed by acidification of the solution to a desired pH with an acid.

2. The aqueous, high molecular weight resole solution of claim 1 wherein the phenolic compound is phenol.

3. The aqueous, high molecular weight resole solution of claim 1 wherein the aldehyde is formaldehyde.

4. The aqueous, high molecular weight resole solution of claim 1 wherein the metal chelating agent is disodium EDTA.

5. The aqueous, high molecular weight resole solution of claim 1 wherein the metal chelating agent is citric acid.

6. The aqueous, high molecular weight resole solution of claim 1 wherein the metal chelating agent is a combination of disodium EDTA and citric acid.

7. The aqueous, high molecular weight resole solution of claim 1 wherein the phenolic carboxylate is salicylic acid.

8. The aqueous, high molecular weight resole solution of claim 1 wherein the condensation takes place at a pH ranging from about 8 to about 10.

9. The aqueous, high molecular weight resole solution of claim 1 wherein the acid is benzoic acid.

10. The aqueous, high molecular weight resole solution of claim 1, wherein the acid is ascorbic acid.

11. The aqueous, high molecular weight resole solution of claim 1, wherein the molar ratio of the phenolic compound to the aldehyde is about 1:1.8 to about 1:3.0.

12. The aqueous, high molecular weight resole solution of claim 1, wherein the molar ratio of the phenolic compound to the aldehyde is about 1:2.0 to about 1:2.5.

13. The aqueous, high molecular weight resole solution of claim 1, further comprising urea.

14. The aqueous, high molecular weight resole solution of claim 1, wherein the solution is a clear solution.

15. A process for the preparation of an aqueous, high molecular weight resole solution comprising:
   a) heating a phenolic compound, an aldehyde, a strong base, a phenolic carboxylate, and a metal chelating agent at a temperature ranging from about 60° to about 75° C., forming a methylol solution;
   b) condensing the methylol solution of step (a) at a pH ranging from about 8 to about 10, forming a polymer solution; and
   c) acidifying the polymer solution of step (b) with an acid.

16. The process of claim 15 wherein the phenolic compound is phenol.

17. The process of claim 15 wherein the aldehyde is formaldehyde.

18. The process of claim 15 wherein the metal chelating agent is disodium EDTA.

19. The process of claim 15 wherein the metal chelating agent is citric acid.

20. The process of claim 15 wherein the metal chelating agent is a combination of disodium EDTA and citric acid.

21. The process of claim 15 wherein the phenolic carboxylate is salicylic acid.

22. The process of claim 15 wherein the condensation takes place at a pH ranging from about 8 to about 10.

23. The process of claim 15 wherein the acid is benzoic acid.

24. The process of claim 15, wherein the acid is ascorbic acid.

25. The process of claim 15, wherein the molar ratio of the phenolic compound to the aldehyde is about 1:1.8 to about 1:3.0.

26. The process of claim 15, wherein the molar ratio of the phenolic compound to the aldehyde is about 1:2.0 to about 1:2.5.

27. The process of claim 15, further comprising urea.

28. The process of claim 15, wherein the aqueous, high molecular weight resole solution is a clear solution.

29. A process for the preparation of an aqueous, high molecular weight resole solution comprising:
   a) heating a phenolic compound, a strong base, a phenolic carboxylate, and metal chelating agent at a temperature ranging from about 60° to about 75° C., forming a solution;
   b) adding an excess of aldehyde to the solution of step (a) to form a mixture and condensing the mixture at about 90° C. under a vacuum of about 11.8 inches of Mercury to a Gardner-Holdt viscosity of U to Z;
   c) cooling the mixture of step (b) to a temperature of about 70° C., adding additional phenol to a desired molar ratio, and adjusting the mixture to a pH of about 9 with an alkali metal hydroxide while holding the mixture at about 70° C. until the free formaldehyde falls to a desired level; and
   d) acidifying the solution of step (c) with an acid.

30. The process of claim 29 wherein the phenolic compound is phenol.

31. The process of claim 29 wherein the aldehyde is formaldehyde.

32. The process of claim 29 wherein the metal chelating agent is disodium EDTA.

33. The process of claim 29 wherein the metal chelating agent is citric acid.

34. The process of claim 29 wherein the metal chelating agent is a combination of disodium EDTA and citric acid.

35. The process of claim 29 wherein the phenolic carboxylate is salicylic acid.

36. The process of claim 29 wherein the condensation takes place at a pH ranging from about 8 to about 10.

37. The process of claim 29 wherein the acid is benzoic acid.

38. The process of claim 29, wherein the acid is ascorbic acid.

39. The process of claim 29, wherein the molar ratio of the phenolic compound to the aldehyde is about 1:1.8 to about 1:3.0.

40. The process of claim 29, wherein the molar ratio of the phenolic compound to the aldehyde is about 1:2.0 to about 1:2.5.

41. The process of claim 29, further comprising urea.

42. The process of claim 29, wherein the aqueous, high molecular weight resole solution is a clear solution.

43. A bonding resin for lignocellulosic materials employed in the production of composite wood panels containing the aqueous, high molecular weight resole solution of claim 1.

44. An aqueous high molecular weight resole solution comprising an acid and a condensate of a phenolic compound and an aldehyde, the condensate formed in the presence of a metal chelating agent, a strong base and a phenolic carboxylate.

45. The aqueous, high molecular weight resole solution of claim 44 wherein the phenolic compound is phenol.

46. The aqueous, high molecular weight resole solution of claim 44 wherein the aldehyde is formaldehyde.

47. The aqueous, high molecular weight resole solution of claim 44 wherein the metal chelating agent is disodium EDTA.

48. The aqueous, high molecular weight resole solution of claim 44 wherein the metal chelating agent is citric acid.

49. The aqueous, high molecular weight resole solution of claim 44 wherein the metal chelating agent is a combination of disodium EDTA and citric acid.

50. The aqueous, high molecular weight resole solution of claim 44 wherein the phenolic carboxylate is salicylic acid.

51. The aqueous, high molecular weight resole solution of claim 44 wherein the condensation takes place at a pH ranging from about 8 to about 10.

52. The aqueous, high molecular weight resole solution of claim 44 wherein the acid is benzoic acid.

53. The aqueous, high molecular weight resole solution of claim 44, wherein the acid is ascorbic acid.

54. The aqueous, high molecular weight resole solution of claim 44, wherein the molar ratio of the phenolic compound to the aldehyde is about 1:1.8 to about 1:3.0.

55. The aqueous, high molecular weight resole solution of claim 44, wherein the molar ratio of the phenolic compound to the aldehyde is about 1:2.0 to about 1:2.5.

56. The aqueous, high molecular weight resole solution of claim 44, further comprising urea.

57. The aqueous, high molecular weight resole solution of claim 44, wherein the solution is a clear solution.

58. A cured resin comprising the aqueous, high molecular weight resole solution of claim 1.

59. A clear, aqueous resin prepared by the process set forth in claim 15.

60. A clear, aqueous resin prepared by the process set forth in claim 29.

* * * * *